United States Patent
Tamamura

(10) Patent No.: US 8,643,832 B2
(45) Date of Patent: Feb. 4, 2014

(54) INCLINATION DETECTOR AND LASER MARKER

(75) Inventor: Akihito Tamamura, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 817 days.

(21) Appl. No.: 12/718,500

(22) Filed: Mar. 5, 2010

(65) Prior Publication Data

US 2010/0231898 A1    Sep. 16, 2010

(30) Foreign Application Priority Data

Mar. 11, 2009   (JP) .................................. 2009-057841

(51) Int. Cl.
*G01B 11/26* (2006.01)

(52) U.S. Cl.
USPC .................................. 356/139.1; 356/139.01

(58) Field of Classification Search
USPC ............. 356/3.01–3.15, 4.01–4.1, 5.01–5.15, 356/6–22, 139.01–139.1
See application file for complete search history.

(56) References Cited

U.S. PATENT DOCUMENTS

| | | | |
|---|---|---|---|
| 5,619,802 A * | 4/1997 | Rando et al. ................... 33/291 |
| 6,057,916 A * | 5/2000 | Kitajima ................... 356/139.1 |
| 7,515,257 B1 * | 4/2009 | Roe et al. ................... 356/152.3 |
| 2008/0307885 A1 * | 12/2008 | Ravitch et al. ................. 73/597 |

FOREIGN PATENT DOCUMENTS

| | | |
|---|---|---|
| JP | 2-37315 U | 3/1990 |
| JP | 8-219780 | 8/1996 |
| JP | 9-250923 | 9/1997 |
| JP | 9-304060 | 11/1997 |
| JP | 10-318747 | 12/1998 |
| JP | 2008-281342 A | 11/2008 |
| JP | 2008-309660 | 12/2008 |
| JP | 2010-066139 A | 3/2010 |
| SU | 591690 * | 1/1976 |

* cited by examiner

*Primary Examiner* — Luke Ratcliffe
(74) *Attorney, Agent, or Firm* — Whitham, Curtis, Christofferson & Cook, P.C.

(57) ABSTRACT

An inclination detector includes: a casing; a light source installed in the casing; a reflector being suspended with a suspender to be at a certain position in the casing and reflecting a light beam from the light source to a direction different from a light axis direction; and a detector that outputs a signal corresponding to a projected position of the light beam, and an inclination of the casing is detected based on the projected position of the light beam reflected by the reflector.

9 Claims, 7 Drawing Sheets

INCLINATION DETECTOR AND LASER MARKER

BACKGROUND OF THE INVENTION

1. Field of the Invention

The present invention relates to: an inclination detector used in apparatuses and devices that require accurate inclination angle detection such as a laser marker, a surveying device, and a measuring device; and to a laser marker using the same.

2. Description of the Related Art

Some apparatuses and devices that require accurate inclination angle detection such as a laser marker, a surveying device, and a measuring device, allow an inclination thereof to be corrected through adjustment including inclination angle detection, and manual operation or automatic control. To adjust and control an inclination of a device accurately, an inclination of the device needs to be accurately detected. Inclination angle detectors are available that use: bubbles; or an electric resistance of an electrolytic solution.

In the inclination detector using bubbles, a light beam is projected from a light source disposed at one side and a light sensor disposed at the other side across a bubble tube detects a light beam projected position. Thus, the inclination is detected (see, for example Japanese Patent Application Publication No. 9-304060). In an inclination detector disclosed in Japanese Patent Application Publication No. 9-304060, light beams from a light source are converted into a parallel pencil. The parallel pencil transmits through a bubble tube and the transmitted light is guided to a light sensor through a lens. The light sensor is a photoelectric transducer having an acceptance surface divided into two or four. A difference in amounts of light received between each of the segmented acceptance surfaces is detected from a difference between outputs of each of the acceptance surfaces. Specifically, in a non-inclined state, the bubbles stay at a center portion of the bubble tube. Therefore, amounts of light received by each of the segmented acceptance surfaces are the same and no output difference is produced. However, in an inclined state, a position of the bubbles is shifted to produce difference in amounts of received light between each of the acceptance surfaces. Therefore, based on a difference between outputs detected therefrom, direction and an angle of inclination can be detected.

The inclination detector using electric resistance of an electrolytic solution includes: a common electrode disposed at the center in the horizontal direction of a container containing the electrolytic solution; and external electrodes each disposed at both sides of the common electrode with certain distances therebetween. The inclined inclination detector produces between the external electrodes a difference in sizes of areas which are in contact with the electrolytic solution. Accordingly, a difference is produced between: an electrical resistance between one of the outer electrodes and the common electrode; and an electrical resistance between the other outer electrode and the common electrode. The inclination is detected through detecting the difference in the electric resistances (see, for example Japanese Patent Application Publication No. 9-250923, Japanese Patent Application Publication No. 10-318747, and Japanese Patent Application Publication No. 8-219780). The inclination detector using an electric resistance of an electrolytic solution contains the electrolytic solution in a manner that bubbles are produced in the electrolytic solution container, and thus is a sort of an inclination angle detector using a bubble tube. However, the detection method is different therefrom.

Detection accuracies of both inclination detectors using a bubble tube or electric resistance of an electrolytic solution degrade due to a temperature change. In the inclination detector using a bubble tube, the bubbles in the bubble tube bloats/contracts due to a temperature change to change the detection characteristics of a sensor, thereby degrading the detection accuracy. In the inclination detector using an electric resistance of an electrolytic solution, the electric resistance of the electrolytic solution changes due to a temperature change. Thus, a temperature change produces error in detection result. Therefore, whether either of the methods is used, with conventional inclination detectors, error in detection result is produced due to a temperature change. Thus, correction for temperature is required and the detection accuracy is difficult to be improved.

An inclination detector is known that is free of the problem the conventional inclination detectors have, i.e., detection error due to a temperature change, and thus requires no extra temperature correction unit (see, for example Japanese Patent Application Publication 2008-309660).

SUMMARY OF THE INVENTION

In an inclination detector disclosed in Japanese Patent Application Publication 2008-309660, a light beam from a light source disposed at one side is projected on a light sensor disposed at the other side via a light collimating lens. An inclination is detected through detecting the projected position. The inclination detector disclosed in Japanese Patent Application Publication 2008-309660 can provide higher detection accuracy compared with those of Japanese Patent Application Publication No. 9-304060, Japanese Patent Application Publication No. 9-250923, Japanese Patent Application Publication No. 10-318747, and Japanese Patent Application Publication No. 8-219780, and requires no temperature correction unit. Still, error produced in the light sensor due to a temperature change needs to be further corrected to further improve the inclination detection accuracy.

For example, an output current fluctuation of the light sensor used under the environment with temperature changing from 0° C. to 40° C. is about 10 mV. The magnitude of the output change due to the movement of the light beam is about 1000 mV, and minimum detectable angle is substantially 2 degrees. In the environment described above, detected angle error of 0.02 degree (±0.01 degree) at maximum is produced. Thus, the conventional inclination detector has minimum detectable angle of substantially 2 degrees and the resolution of 0.02 degrees. To detect an even smaller angle, a unit is required that corrects the error produced on the light sensor due to the temperature.

In view of the above, an object of the present invention is to provide: an inclination detector free of the problems in the conventional techniques, allowing detection of a minute angle with higher accuracy, and requiring no temperature correction unit; and a laser marker using the inclination detector.

An inclination detector according to an aspect of the present invention includes: a casing; a light source installed in the casing; a reflector being suspended with a suspender to be at a certain position in the casing and reflecting a light beam from the light source to a direction different from a light axis direction; and a detector that outputs a signal corresponding to a projected position of the light beam. An inclination of the casing is detected based on the projected position of the light beam reflected by the reflector.

Preferably, the inclination detector according to the present invention further includes: transparent liquid surrounding the reflector; and a holder that holds the transparent liquid. Braking force is applied with the transparent liquid to the reflector that swings along with the inclination of the casing.

Preferably, the inclination detector according to the present invention further includes a reflector holder suspended from a ceiling of the casing with a plurality of suspenders. The reflector is fixed to the reflector holder.

Preferably, in the inclination detector according to the present invention, a copper plate is fixed on a bottom surface of the reflector holder, a magnet is fixed on an inner side of a bottom surface of the casing, and the reflector is fixed to the reflector holder and braking force is applied with the copper plate and the magnet to the reflector holder.

Preferably, in the inclination detector according to the present invention, the detector has an acceptance surface divided into a plurality of acceptance surfaces, and a detection signal is output from an output terminal corresponding to each of the acceptance surfaces.

Preferably, in the inclination detector according to the present invention, the inclination of the casing is detected based on a difference between detection signals output from the output terminals each corresponding to each of the acceptance surfaces of the detector.

Preferably, in the inclination detector according to the present invention, a reflection surface of the reflector is spherical.

A laser marker according to another aspect of the present invention includes the inclination detector.

EFFECT OF THE INVENTION

Although the light source and the detector incline along with the inclination of the casing, the reflector maintains a constant posture so as to be inclined with respect to the light source and the detector. As a result, a spot position on the sensor at which the light beam emitted from the light source and reflected by the reflector is projected changes. The change of the position on the sensor on which the light beam is projected, which corresponds to an inclination direction and a level of inclination of the casing, changes the output signal of the detector. Thus, the inclination direction and the level of inclination of the casing can be detected.

Because a positional relationship between the reflector and the other materials regarding the inclination of the casing is almost completely unaffected by a temperature change, almost no inclination detection error due to the temperature change produced and a temperature correction unit is not required. Accordingly, the device can be simply structured with less detection accuracy degrading factor.

Because the reflection surface is spherical, a large change in a light beam projected position can be obtained with a slight inclination of the casing. Therefore, a slight inclination angle can be accurately detected.

DETAILED DESCRIPTION OF THE PREFERRED EMBODIMENTS

Embodiments of an inclination detector according to the present invention are described below with reference to the accompanying drawings along with an embodiment of a laser marker including the inclination detector according to the present invention.

First Embodiment

Figure 1:
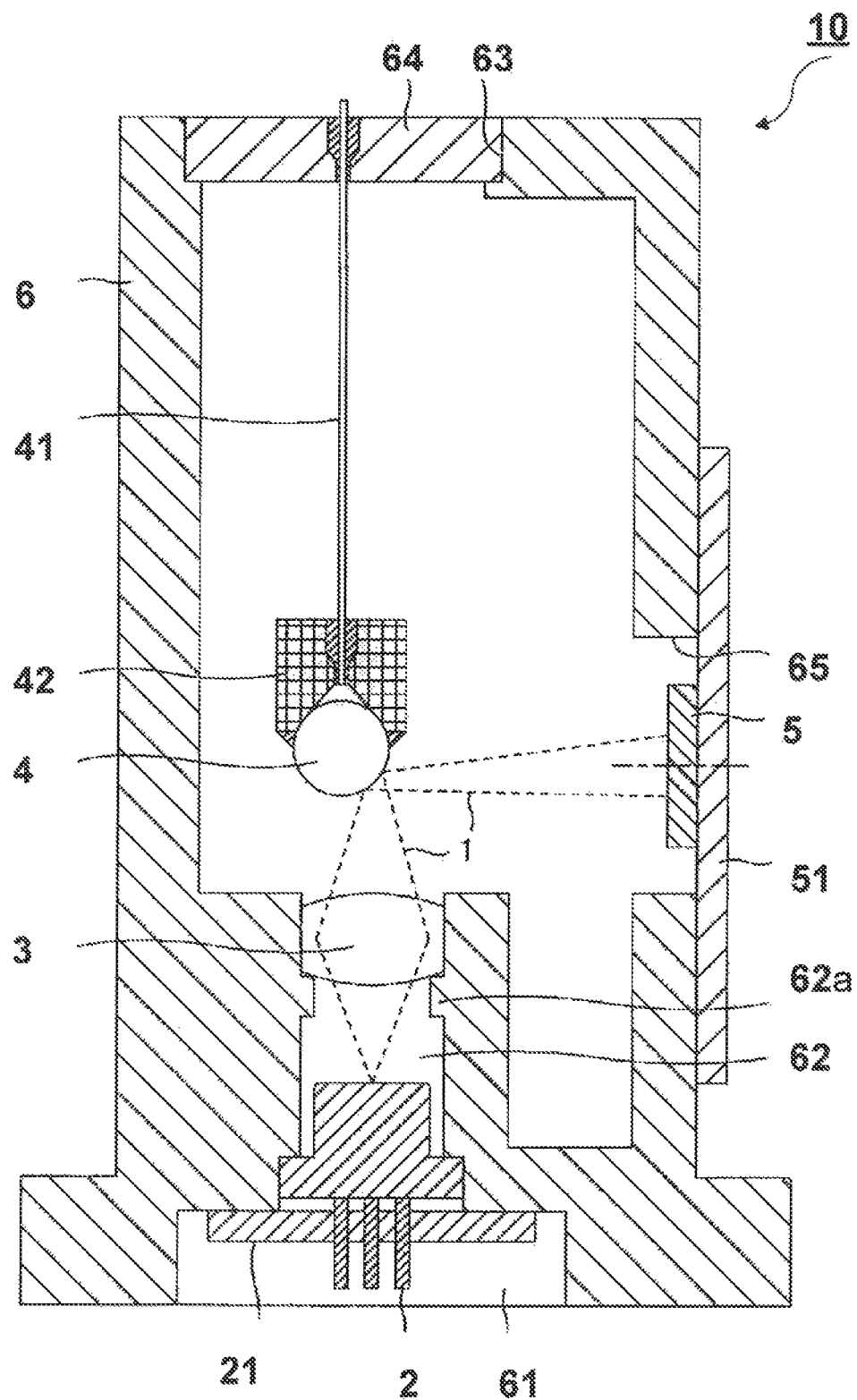
FIG. 1 is a longitudinal sectional view of an embodiment of an inclination detector according to the present invention.

FIG. 1 is a longitudinal sectional view depicting a structure of an inclination detector according to the present invention. In FIG. 1, this inclination detector 10 includes: a light source 2 that emits a light beam 1, i.e., a laser beam; a lens 3 that collimates a plurality of such a light beams 1 in a direction of a light axis; a reflector 4 that reflects the collimated light beams 1 in a direction different from the direction of the light axis; a light sensor 5 that is a detector formed of a photoelectric transducer such as a photo diode (PD) and outputs an electrical signal based on a position of a spot formed by the reflected light beam 1; and a casing 6 that holds or fixes members including the light source 2, the lens 3, the reflector 4, and the light sensor 5, to be in a certain positional relationship.

The light source 2 is a laser diode in which a terminal is fixed by soldering on a circuit board 21 having a circuit pattern to perform a certain signal operation.

An appearance of the casing 6, which has a hollow interior, is a cylinder, polygonal column, or other similar shapes. A recess 61 having a predetermined depth toward the upper side is formed at a central area on the bottom side of a bottom section serving as a base for the casing 6. A communication hole 62 communicated with an inner space of the casing 6 and serves as a light path for the light beam 1 is formed near the center of the recess 61. A circuit board 21 is fixed in the recess 61 and the light source 2 fits in an inner periphery of the communication hole 62. Thus, the light beam 1 is emitted upward.

The communication hole 62 has a certain length in the upward direction in the inner space of the casing 6, and has, at an inner periphery thereof near the middle in the height direction, a protrusion 62a. The lens 3 that collimates the light beams 1 emitted from the light source 2 fits the protrusion 62a to be fixed. Thus, the protrusion 62a serves as a lens holder.

The lens 3 collimates the light beams 1, which are diffusion light emitted from the light source 2, to a light axis direction. The lens 3 has refractive force for forming a light spot of a certain size on the reflection surface of the reflector 4. The lens 3 can be made of any materials or have any shapes as long as the light collimating function as described above is maintained. For example, instead of a biconvex lens as shown in FIG. 1, the lens 3 may be a semi convex lens or a sphere lens.

The light beams 1 that have transmitted through the lens 3 to be collimated is reflected by the reflector 4 disposed at a certain position inside the casing 6 to be projected on the light sensor 5. The surface of the reflector 4 is covered with a material that reflects the light beam 1 and is, preferably, a spherical surface. The reflector 4 itself may be a light reflecting material such as a sphere lens. With the spherical reflecting surface, even a slight inclination causes a position on the reflection surface irradiated with the light beam 1 to change largely. Thus, the reflection angle of the light beam 1 becomes large, making the change in the light beam 1 projected position on the light sensor 5 large. The shape of the reflector in the inclination detector according to the present invention may be a hemisphere or a circular cone instead of a sphere as long as the reflecting surface thereof is spherical.

A suspender 41 is provided in the inner space of the casing 6 in a vertically descending manner. The suspender 41 has one end fixed to a holder 64 fit inside a hole 63 formed on the ceiling of the casing and the other end fixed to a reflector holder 42.

The suspender 41 may be: a rigid material such as a steel wire for springs; or a non-rigid, string-like material such as a stranded wire.

Figure 7:
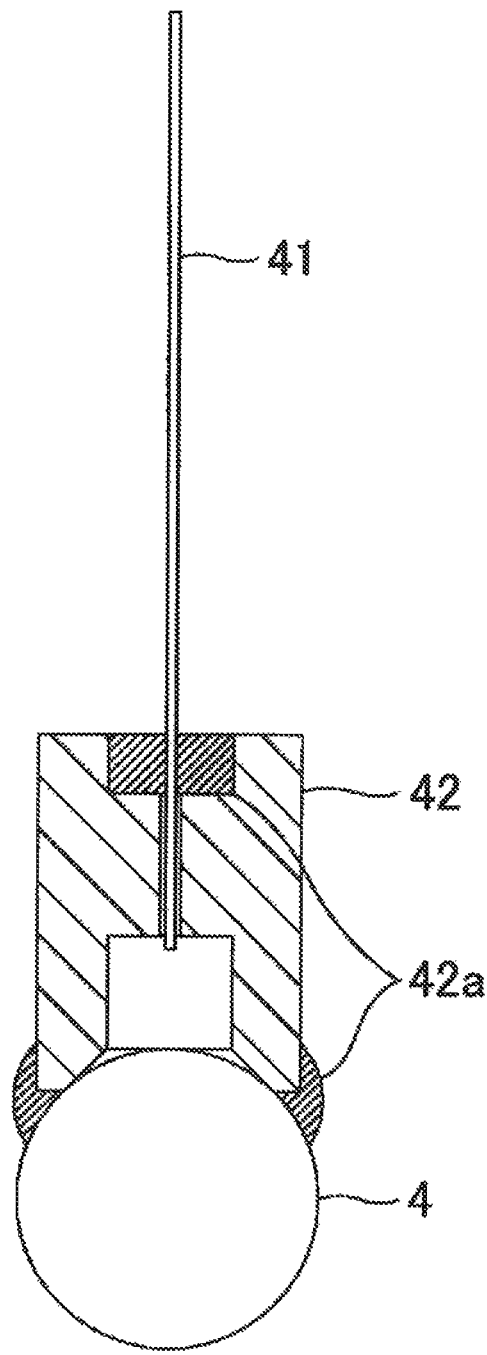
FIG. 7 is an enlarged view schematically depicting a connected state of a reflector and a reflector holder, both of which are included in the inclination detector according to the present invention.

The reflector 4 is fixed to the reflector holder 42 fixed to the end of the suspender 41. How the reflector 4, the suspender 41, and the reflector holder 42 are connected is described below with reference to FIG. 7. As shown in FIG. 7, the reflector holder 42 has a hole penetrating in the vertical direction at the center thereof, and an H-shaped cross-section. The suspender 41 is inserted through the hole and an adhesive 92a is poured in a recess at the upper side of the reflector holder 42 to fix the lower end portion of the suspender 41.

An inner peripheral surface on the lower end side of the reflector holder 42 is chamfered to be a processed surface suitable for fitting the reflector 4. The reflector 4 contacts the inner peripheral surface and the adhesive 42a is applied on the area around the contacted surface. Thus, the reflector 4 is fixed.

The reflector 4, the suspender 41, and the reflector holder 42 are integrated in the above arrangement. By fixing the upper end portion of the suspender 41 at the ceiling of the casing 6, the reflector 4 can be swingably disposed in the inner space of the casing 6 with a certain distance from the bottom.

In the inclination detector according to the present invention, the reflector 4 may be directly fixed to the suspender 41 without the reflector holder 42. Still, with the reflector holder 42, the weight of a portion to be in a pendulum motion, and accuracy of the inclination detector can be more easily adjusted. Thus, the reflector 4 is preferably disposed with the reflector holder 42.

Returning to FIG. 1, the light sensor 5 is fixed in a hole 65 on a side surface (the side surface on the right as seen in FIG. 1) of the casing 6 with an acceptance surface thereof facing the inner space. More specifically, a circuit board 51 including the light sensor 5 closes the hole 65 from the outside with the light sensor 5 facing the inner space.

The length and the position of the suspender 41 is adjusted so that, in the casing 6 not inclined, the light beam 1 reflected by the reflector 4 forms a beam spot of a certain size on the center of the light sensor 5.

Preferably, in the casing 6 not inclined, an angle between a hypothetical center line of the light axis and a hypothetical center line of the reflected light forming the spot on the light sensor 5 is 90 degrees; and a tangent line of the reflection surface in witch the light beam 1 is projected is inclined by 45 degrees with respect to the vertical direction.

A disposed position of the reflector 4, in the casing 6 not inclined, does not necessarily conform with the above disposing condition, and may be arbitrarily set as long as the light reflected thereby forms a spot of a certain size on the center of the light sensor 5.

Figure 2:
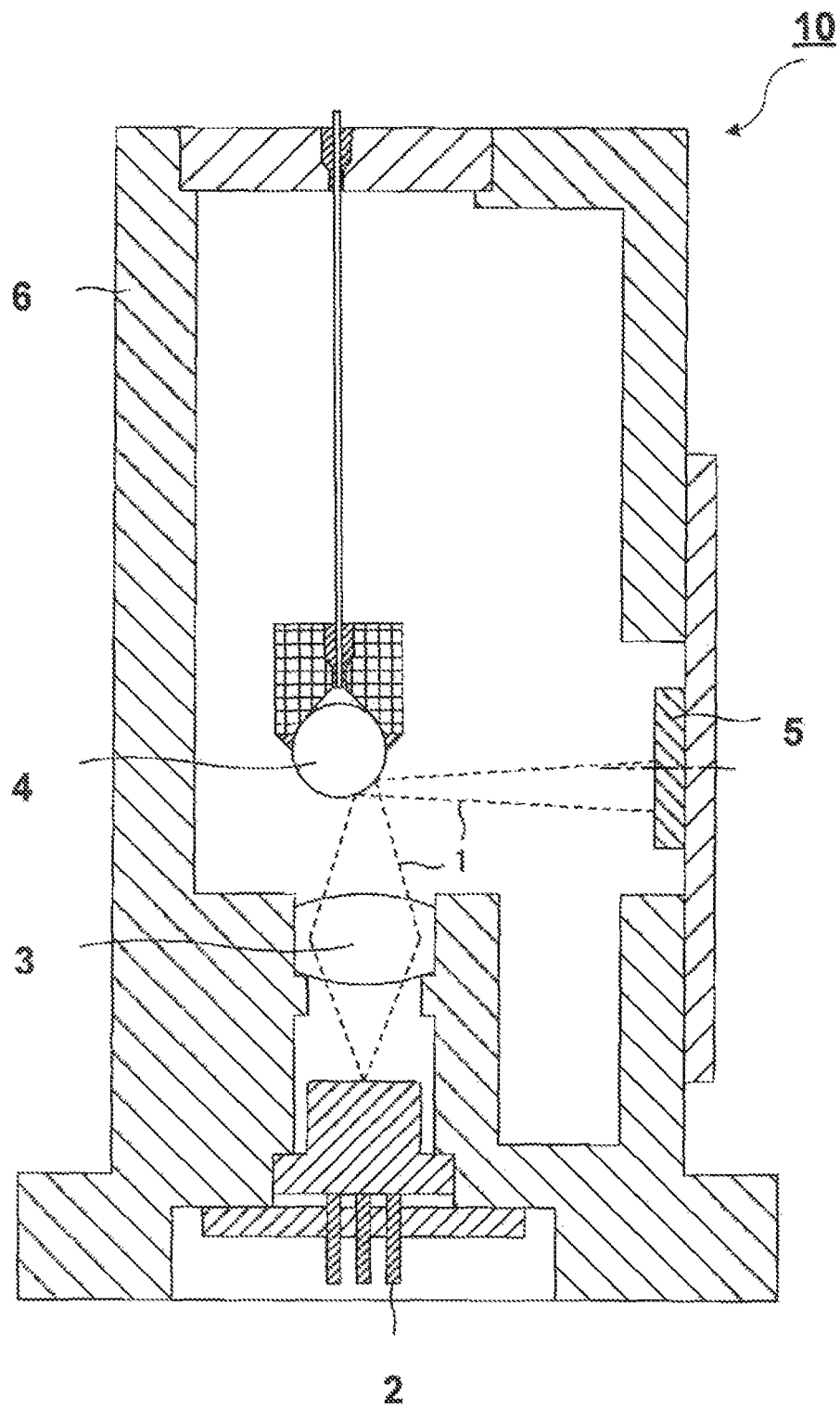
FIG. 2 is a longitudinal sectional view depicting a state in which the inclination detector has inclined to one of the directions.

FIG. 2 is a longitudinal sectional view depicting a state of the inclination detector 10 inclined toward the right. As shown in FIG. 2, the rightward inclination of the inclination detector 10 is accompanied by the rightward inclination of the direction of the light source 2 to incline the light axis of the light beam 1. However, the reflector 4 is not affected by the inclination and stays at the same position as that in the non-inclined state. Thus, the position on the reflector 4 irradiated with the light beam 1 is shifted downward in the reflector 4. Further, along with the inclination of the inclination detector 10, the position of the light sensor 5 with respect to the light axis of the light beam 1 is shifted upward. Therefore, the light spot on the light sensor 5 is positioned downward compared with that in the non-inclined state. Accordingly, the rightward inclination of the inclination detector 10 is accompanied by the downward shift of the position of the light spot projected on the light sensor 5 compared with that in the non-inclined state. Thus, the inclined direction and the amount of inclination can be detected by detecting the position of the light spot.

Figure 3:
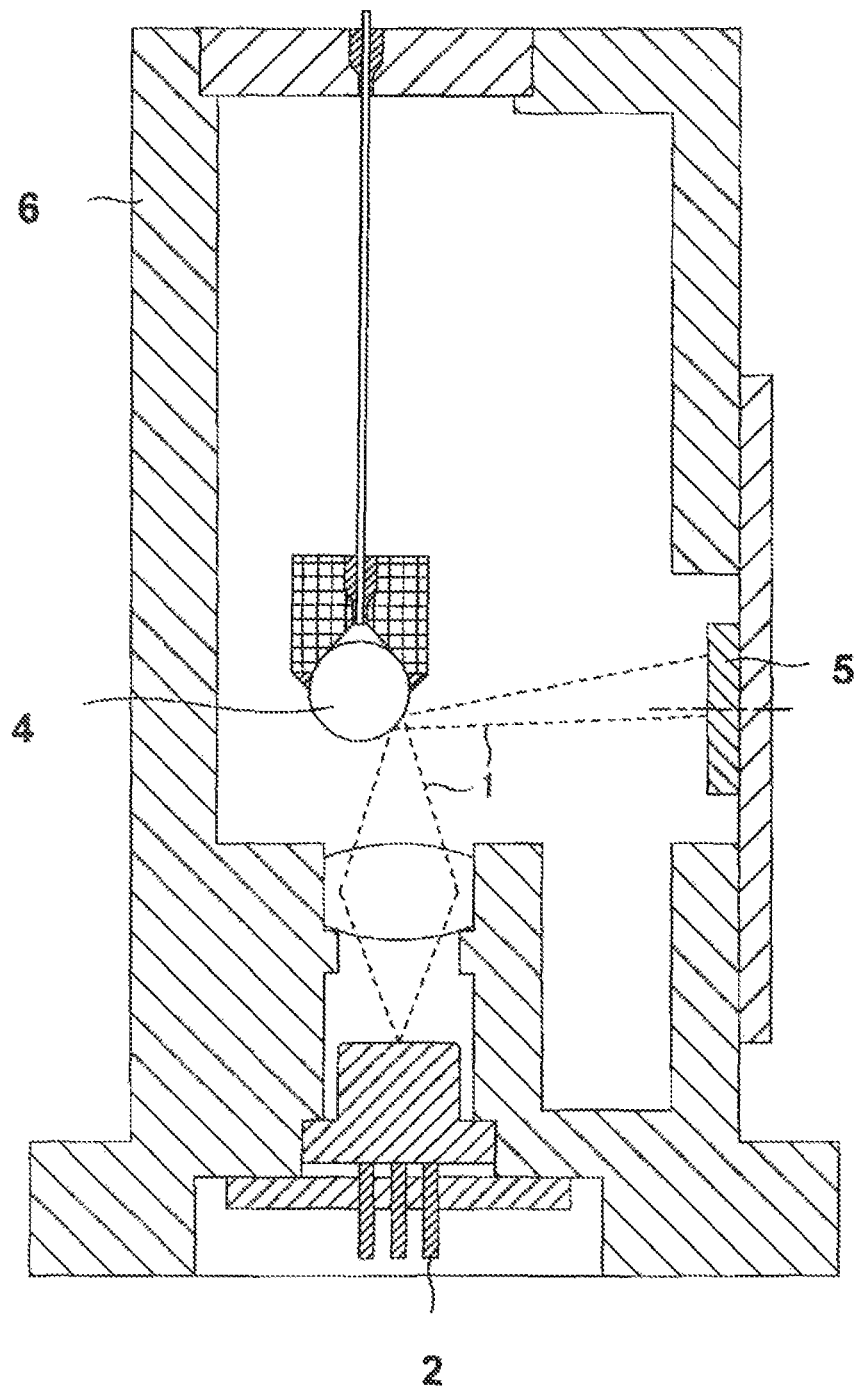
FIG. 3 is a longitudinal sectional view depicting a state in which the inclination detector has inclined to another direction.

FIG. 3 is a longitudinal sectional view depicting a state of the inclination detector 10 inclined toward the left. As shown in FIG. 3, the leftward inclination of the inclination detector 10 is accompanied by the leftward inclination of the light source 2 to incline the light axis of the light beam 1. However, the reflector 4 is not affected by the inclination and stays at the same position maintaining the vertically descending state as that in the non-inclined state. Thus, the position on the reflector 4 irradiated with the light beam 1 is shifted upward in the reflector 4 compared with that in the non-inclined state.

Further, in the inclination detector 10 inclined towards the left, the position of the light sensor 5 with respect to the light axis of the light beam 1 is shifted downward. Therefore, the leftward inclination of the inclination detector 10 is accompanied by the upward shift of the light spot projected position on the light sensor 5 compared with that in the non-inclined state. All things considered, in the inclined inclination detector, the light spot projected position on the light sensor 5 is shifted from that in the non-inclined state. Thus, the output of the light sensor 5 changes to allow detection of the inclination direction and the amount of the inclination.

Referring to FIG. 4, a relationship is described below between an inclination of the inclination detector 10 and the light spot formed on the light sensor 5 with the light beams 1 emitted from the light source 2, collimated by the lens 3, and reflected by the reflector 4. The light sensor 5 fixed on the wall surface of the casing 6 facing inwardly has a form of a rectangular plate. The acceptance surface of the light sensor 5 is equally divided into a plurality of acceptance surfaces. For example, the light sensor 5 is divided in quarters with the lines orthogonal to each other to form a cross shape.

In the non-inclined inclination detector 10, the light sensor 5 is disposed with the acceptance surface thereof orthogonal to the light axis of the reflected light, and with the position of the reflection surface of the reflector 4 set at the intersection of the orthogonal lines. Thus, the light axis is on the intersection of the dividing lines orthogonal to each other to form a cross shape.

Figure 4A:
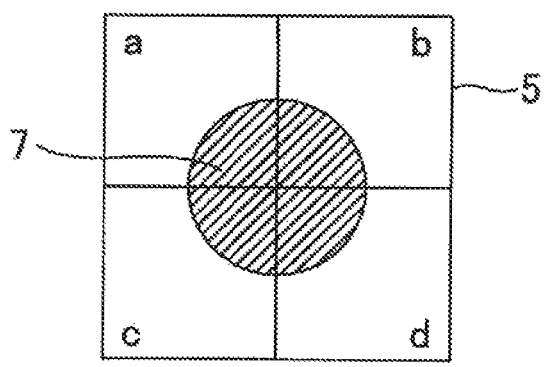
FIG. 4A is a schematic of a light detector and a light receiving position thereof in the embodiment of the inclination detector not inclined.

Therefore, a projection pattern 7 of the light beam projected on the acceptance surface of the light sensor 5 is, as shown in FIG. 4A, a circle with the center being the intersection of the lines forming a cross shape. For the convenience of the explanation, as shown in FIG. 4A, each of the four segmented acceptance surfaces on the upper left, upper right, lower left, and lower right, of the light sensor 5 is provided with reference numerals a, b, c, and d, respectively. Here, sizes of areas accepting light and the output signal of each of the acceptance surfaces a, b, c, and d are the same. Therefore, a difference between the outputs of the acceptance surfaces at the left side and the right side is:

(a+c)−(b+d)=0.

The difference between the outputs of the acceptance surfaces at the upper side and the lower side indicating inclination of the inclination detector 10 in the forward or backward direction is:

(a+b)−(c+d)=0.

The non-inclined state of the inclination detector can be set by adjusting the length and the position of the suspender 41 and disposing the reflector 4 at a certain position to produce no differences in the outputs between the acceptance surfaces: at the left and the right side; and at the upper side and the lower side.

Figure 4B:
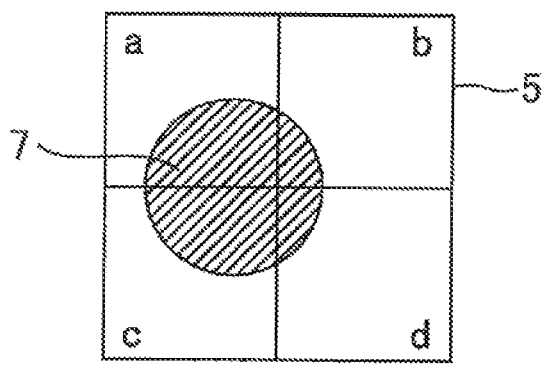
FIG. 4B is a schematic of the light detector and the light receiving position thereof in the embodiment of the inclination detector inclined toward one of the directions.

For example, a rightward inclination of a device including the inclination detector 10 with the acceptance surface of the light sensor 5 in a straight posture and facing the device in the front is accompanied by the rightward inclination of the light source 2 and the light sensor 5 of the inclination detector 10. However, with the suspender 41, the reflector 4 constantly stays at the predetermined position maintaining the vertically descending state. As a result, as shown in FIG. 4B, the position of the light axis of the light beam 1 reflected by the reflector 4 moves to the left side on the light sensor 5, making the projection pattern 7 of the light beam 1 projected on the acceptance surface of the light sensor 5 mainly included in the left side. Here, a positive value is obtained from the expression (a+c)−(b+d). The inclination of the apparatus is corrected or adjusted to zero the value.

Figure 4C:
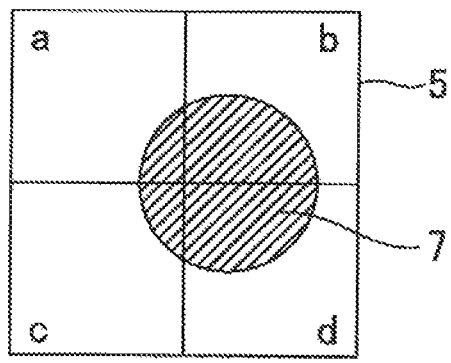
FIG. 4C is a schematic of the light detector and the light receiving position thereof in the embodiment of the inclination detector inclined toward the direction opposite to that in FIG. 4B.

For example, with a leftward inclination of the device including the inclination detector 10 with the acceptance surface of the light sensor 5 in a straight posture and facing the device in the front, as shown in FIG. 4C, the position of the light axis of the light beam 1 reflected by the reflector 4 moves to the right side in the light sensor 5, making the projection pattern 7 of the light beam 1 projected on the acceptance surface of the light sensor 5 mainly included in the right side. Here, a negative value is obtained from the expression (a+c)−(b+d). The inclination of the apparatus is corrected or adjusted to zero the value.

The cases in which the inclination detector 10 is inclined leftward and rightward are exemplary described in the above description. An inclination of the inclination detector 10 in the frontward or backward direction can be corrected and adjusted in a similar manner. In such a case, (a+b)−(c+d) is calculated based on the output from each of the four segmented acceptance surfaces and the inclination is corrected or adjusted to zero an obtained value.

Second Embodiment

Another embodiment of the inclination detector according to the present invention is described below. In this inclination detector 10a, as shown in FIG. 5, in addition to the configuration of the inclination detector 10 as described above, an area around the reflector 4 is filled with liquid to apply braking force to the movement of the reflector 4 due to the inclination of the casing 6.

Figure 5:
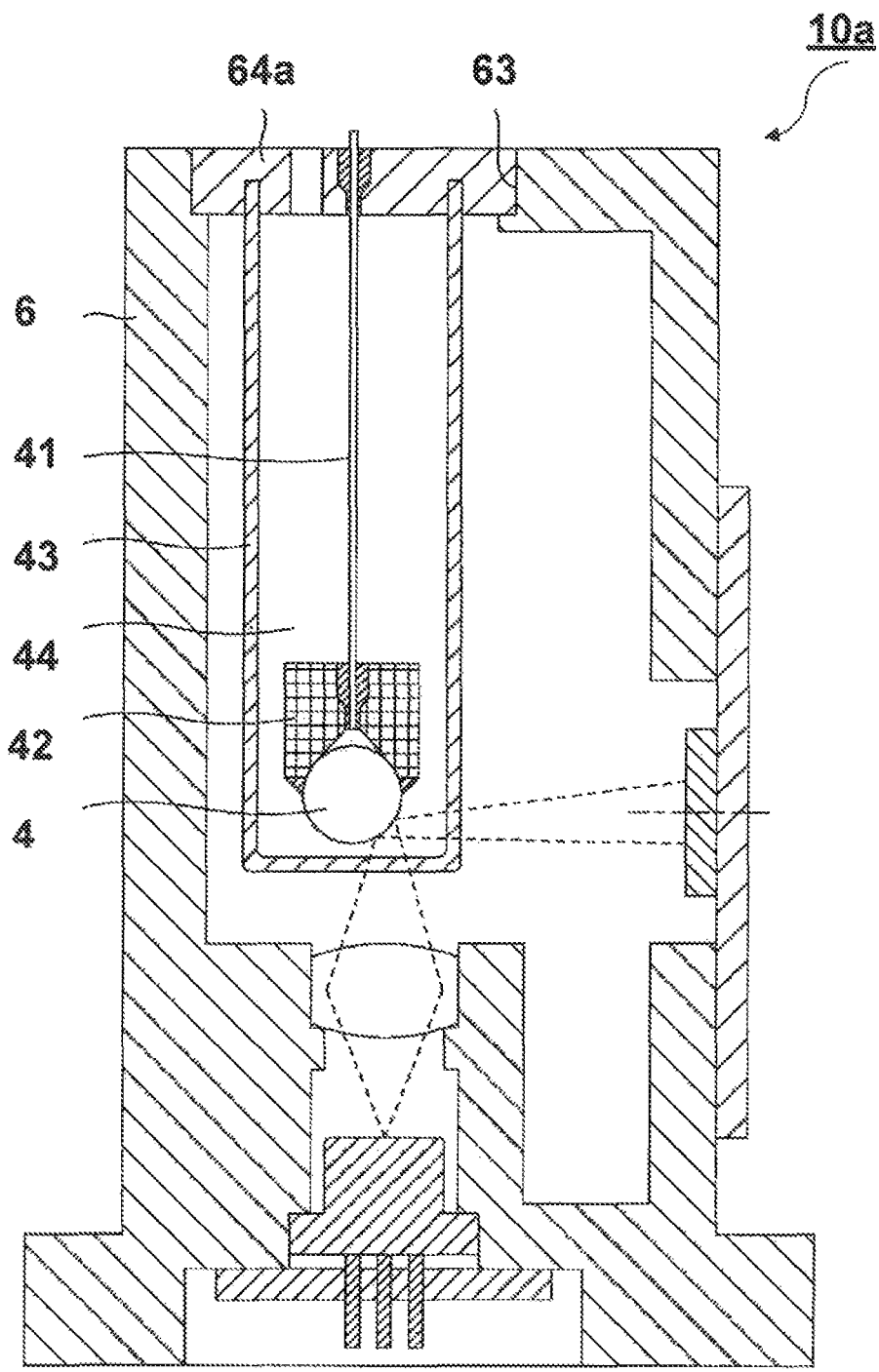
FIG. 5 is a longitudinal sectional view of another embodiment of the inclination detector according to the present invention.

As shown in FIG. 5, in the inclination detector 10a, a tube 43 is fixed to surround an area around the reflector 4 disposed in the inner space of the casing 6 with the suspender 41 having one of the ends fixed in a holder 64a fit inside the hole 63 at the ceiling of the casing 6.

The tube 43 is filled with transparent liquid 44 so that the braking force is applied against swing movement of the reflector 4. The braking force applied by the transparent liquid 44 can make the reflector 4 stay at a proper position promptly and accurately to allow the detection of the inclination under a sudden inclination of the casing 6.

The tube 43 is formed of a transparent material such as a glass tube. Note that other materials can be used as long as the light beam 1 reflected by the reflector 4 is not refracted.

Any material that has high transparency and is less likely to be altered or deteriorated such as highly transparent silicone oil can be used as the liquid 44.

Third Embodiment

Figure 6:
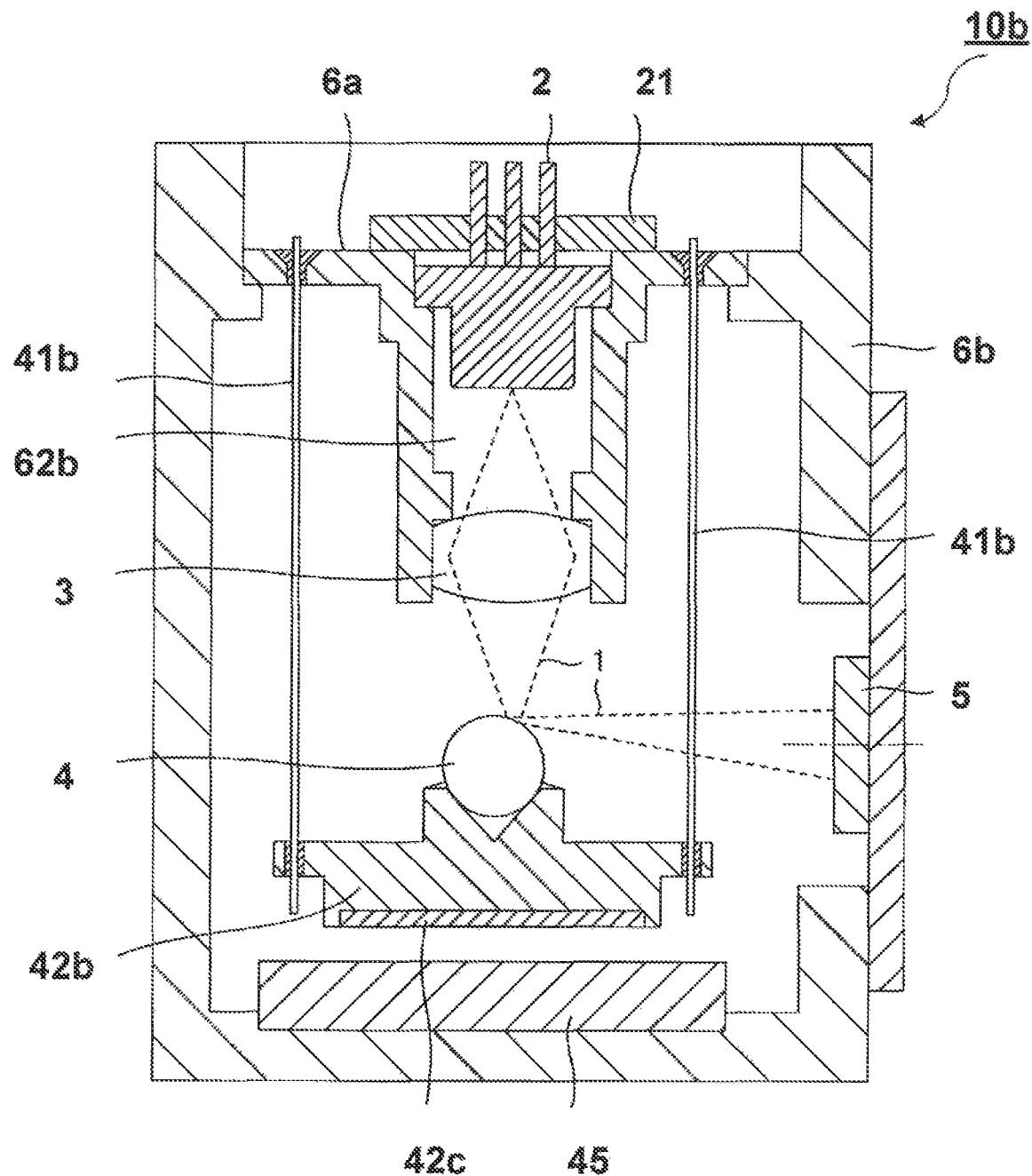
FIG. 6 is a longitudinal sectional view of a still another embodiment of the inclination detector according to the present invention.

Still another embodiment of an inclination detector according to the present invention is described below. As shown in FIG. 6, in this inclination detector 10b: the light source 2 that emits the light beam 1 is disposed at the ceiling side of a casing 6b; the spherical reflector 4 is disposed at a certain position with a reflector holder 42b suspended from the ceiling; and the light collimating lens 3 is disposed between the light source 2 and the reflector 4 as in the first and the second embodiments.

The light beams 1 emitted from the light source 2 are collimated in the light axis direction with the light collimating lens 3, and reflected by the reflector 4 to form a beam spot on the light sensor 5 fixed to a side wall of the casing 6b.

A holder 6a holding the light source 2 and the light collimating lens 3 is fit in a hole formed on the ceiling of the casing 6b to be fixed. The holder 6a has a shape of a cylinder having a flange-shaped section at the upper end. The light source 2 is fit in the center of the flange section and the inner space of the cylindrical section is a communication hole 62b, which serves as a light path for the light beam 1. The holder 6a is fixed to the casing 6b as the outer periphery of the flange section fits the ceiling of the casing 6b. A protrusion for fixing the light collimating lens 3 is formed near the middle of the communication hole 62b in the length direction. The light collimating lens 3 is fixed to be in contact with the protrusion.

A plurality of suspenders 41b each has one of the ends fixed in the flanged section of the holder 6a and vertically descends in the inner space of the casing 6b. The other end of each of the suspenders 41b is fixed to a reflector holder 42b. A recess for fixing the reflector 4 is formed near the center of the reflector holder 42b in which the reflector 4 is fixed.

The inclination of the casing 6b is accompanied by the inclinations of the light source 2, the light collimating lens 3, and the light sensor 5. However, the reflector holder 42b stays at the certain position maintaining the vertically descending state by the suspender 41b. As a result, the light axis of the light beam 1 relatively shifts with respect to the reflector 4 to shift the beam spot projected on the light sensor 5. By detecting the shift with the light sensor 5 having the structure as that in the first embodiment, the inclination angle of the casing 6 can be detected.

A copper plate 42c is bonded to the bottom of the reflector holder 42b. A magnet 45 is disposed at a position on the inner bottom surface of the casing 6b facing the copper plate 42c. In the casing 6b inclined as described above, the relatively inclined reflector holder 42b receives braking force due to an eddy-current loss produced by the copper plate 42c and the magnet 45. Thus, the reflector holder 42b promptly stays at the position corresponding to the inclination.

In the above described embodiments of the inclination detector: a bubble tube, or a container containing an electrolysis solution is not required as in a conventional inclination detector; and only a light reflecting material is suspended in the casing without suspending a lens disposed between a light source and a light detector. Thus, a simple structured and readily maintained inclination detector can be provided.

Further, because neither the bubbles nor the liquid is used, an inclination can be accurately detected while being almost completely unaffected by a temperature change, thus, requiring no correction for a temperature.

Further, in the inclination detector, light reflected from a spherical surface, instead of light beams collimated with a lens, is projected on a light sensor. Therefore, a slight inclination leads to a large shift of a spot on the light sensor to allow accurate detection of such slight inclination.

Furthermore, higher resolution can be obtained compared with that of a conventional inclination detector. Thus, an inclination detector can be provided having higher resolution compared with that of the conventional inclination detector without a unit that corrects an output fluctuation due to a change in an ambient temperature.

The above described inclination detector is preferably disposed in a laser marker that radiates light beam flux emitted from a laser light source in a single direction to project line light in a vertical or a horizontal direction. The inclination detector according to the present invention is disposed in a laser marker body and adjustment is made to cancel an inclination of the laser marker body. Alternatively, an inclination of a light source unit holder, which is disposed in the laser marker body in a posture controllable manner, is detected by the inclination detector according to the present invention, and the posture of the light source unit holder is controlled to cancel the inclination thereof. Thus, a laser marker having the advantages in the inclination detector according to the present invention as described above can be provided.

What is claimed is:

1. An inclination detector comprising:
   a casing;
   a light source installed in the casing emitting a light beam in a first direction;
   a reflector which is swingably suspended with at least one suspender and reflecting said light beam from the light source to a direction different from said first direction, said reflector has a reflection surface that is a single spherical surface;
   a lens which collimates the light beam from the light source; and
   a detector which produces at least one output signal corresponding to a position of the light beam transmitted through the lens to said reflector and reflected by said reflector, wherein
   an inclination of the casing is detected by said detector based on the at least one output signal.

2. The inclination detector according to claim 1, further comprising:
   transparent liquid surrounding the reflector; and
   a holder that holds the transparent liquid,
   wherein said transparent liquid applies a braking force to the reflector when the reflector swings.

3. The inclination detector according to claim 1 wherein said at least one suspender includes a plurality of suspenders and, further comprising:
   a reflector holder suspended from a ceiling of the casing with said plurality of suspenders, wherein the reflector is fixed to the reflector holder.

4. The inclination detector according to claim 3, further comprising:
   a copper plate fixed on a bottom surface of the reflector holder; and a magnet fixed on an inner side of a bottom surface of the casing, and
   wherein the reflector is fixed to the reflector holder and a braking force is applied to said reflector holder due to an eddy-current loss produced by the copper plate and the magnet.

5. The inclination detector according to claim 1, wherein the detector has a plurality of acceptance surfaces each of which outputs an output signal from an output terminal corresponding to at least one of the acceptance surfaces of said plurality of acceptance surfaces of said detector.

6. The inclination detector according to claim 5, wherein the inclination of the casing is determined based on a difference between said output signals output from the output terminals of said plurality of acceptance surfaces of the detector.

7. A laser marker, comprising:
   a laser marker body;
   laser light source disposed in said laser marker body which emits a laser light flux in a single direction to project line light in a vertical or a horizontal direction; and
   an inclination detector disposed in said laser marker body, comprising
   a casing;
   a light source installed in said casing emitting a light beam in a first direction;
   a reflector which is swingably suspended with at least one suspender and reflecting said light beam from the light source to a direction different from said first direction, said reflector has a reflection surface that is a single spherical surface;
   a lens which collimates the light beam from the light source; and
   a detector with at least one output signal corresponding to a position of the light beam transmitted through the lens and reflected by said reflector,
   wherein an inclination of the laser marker body is detected by said detector based on the at least one output signal, and
   wherein said laser marker is configured to adjust said laser marker body to cancel said inclination of said laser marker body.

8. The inclination detector according to claim 1, wherein the casing has a communication hole and
   the light source fits in an inner periphery of the communication hole.

9. The inclination detector according to claim 4, wherein the casing has a communication hole and
   the light source fits in an inner periphery of the communication hole.

* * * * *